United States Patent
Oetjens et al.

(10) Patent No.: US 10,372,849 B2
(45) Date of Patent: Aug. 6, 2019

(54) PERFORMING AND COMMUNICATING SHEET METAL SIMULATIONS EMPLOYING A COMBINATION OF FACTORS

(71) Applicants: MAGNA INTERNATIONAL INC., Aurora, Ontario (CA); Thomas James Oetjens, Troy, MI (US); Thomas Lome Chartrand, Clarkston, MI (US)

(72) Inventors: Thomas James Oetjens, Troy, MI (US); Thomas Lome Chartrand, Clarkston, MI (US)

(73) Assignee: Magna International Inc., Aurora (CA)

( * ) Notice: Subject to any disclaimer, the term of this patent is extended or adjusted under 35 U.S.C. 154(b) by 301 days.

(21) Appl. No.: 15/317,759

(22) PCT Filed: Jun. 10, 2015

(86) PCT No.: PCT/US2015/035049
§ 371 (c)(1),
(2) Date: Dec. 9, 2016

(87) PCT Pub. No.: WO2015/191678
PCT Pub. Date: Dec. 17, 2015

(65) Prior Publication Data
US 2017/0140080 A1    May 18, 2017

Related U.S. Application Data

(60) Provisional application No. 62/010,818, filed on Jun. 11, 2014.

(51) Int. Cl.
*G06F 17/50* (2006.01)
*B21D 53/88* (2006.01)

(52) U.S. Cl.
CPC ......... *G06F 17/5018* (2013.01); *B21D 53/88* (2013.01); *G06F 17/5009* (2013.01); *G06F 17/5095* (2013.01); *G06F 2217/42* (2013.01)

(58) Field of Classification Search
CPC .............................. G06F 17/50; B21D 53/88
(Continued)

(56) References Cited

U.S. PATENT DOCUMENTS 6,560,498 B1    5/2003  Shin et al.
8,091,395 B2    1/2012  Suzuki et al.
(Continued)

FOREIGN PATENT DOCUMENTS

CN    101014428 A    8/2007
CN    102262688 A    11/2011
(Continued)

OTHER PUBLICATIONS

Translation of Notification of First Office Action in co-pending CN Appln. No. 201580021042.4, dated Dec. 11, 2017.

*Primary Examiner* — Thai Q Phan
(74) *Attorney, Agent, or Firm* — Dickinson Wright PLLC

(57) ABSTRACT

Sheet metal is provided as a template to create a finished product. After various metal transformation techniques are performed on the sheet metal, the sheet metal may be converted to the finished product. The sheet metal manipulation may encompass different techniques, such as thinning, bending, cutting, and the like. The manipulated sheet metal may be sourced for various products, such as a body of a vehicle. The aspects disclosed herein combine various tests employed to detect the integrity of the sheet metal transformation into a singular output.

14 Claims, 6 Drawing Sheets

(58) Field of Classification Search
USPC .......................................... 703/2, 5; 702/48
See application file for complete search history.

(56) References Cited

U.S. PATENT DOCUMENTS

| | | |
|---|---|---|
| 8,463,583 B2 | 6/2013 | Kubli |
| 2008/0004850 A1 | 1/2008 | Wang |
| 2009/0177417 A1 | 7/2009 | Yonemura et al. |
| 2011/0295570 A1 | 12/2011 | Zhu et al. |
| 2012/0123741 A1 | 5/2012 | Kubli |
| 2016/0169791 A1* | 6/2016 | Oetjens ............... G06F 17/5009 702/48 |

FOREIGN PATENT DOCUMENTS

| | | |
|---|---|---|
| JP | 2002505194 A | 2/2002 |
| WO | 99/64939 | 12/1999 |
| WO | 2013005714 A1 | 1/2013 |
| WO | 2013047526 A1 | 4/2013 |

* cited by examiner

PERFORMING AND COMMUNICATING SHEET METAL SIMULATIONS EMPLOYING A COMBINATION OF FACTORS

CROSS REFERENCE TO RELATED APPLICATION

This U.S. National Stage Patent Application claims the benefit of PCT International Patent Application Serial No. PCT/US2015/035049 filed Jun. 10, 2015 entitled "Performing And Communicating Sheet Metal Simulations Employing A Combination Of Factors," which claims the benefit of and priority to U.S. Provisional Patent Application Ser. No. 62/010,818 filed Jun. 11, 2014 entitled "Performing And Communicating Sheet Metal Simulations Employing A Combination Of Factors", the entire disclosures of the applications is incorporated herein by reference.

BACKGROUND

Sheet metal is provided as a template to create a finished product. After various metal transformation techniques are performed on the sheet metal, the sheet metal may be converted to the finished product. The sheet metal manipulation may encompass different techniques, such as thinning, bending, cutting, and the like. The manipulated sheet metal may be sourced for various products, such as a body of a vehicle.

Producers of the various products that employ sheet metal often use computer aided design (CAD) programs to aid in the design and simulation of the products. A designer may enter parameters associated with the end product in the CAD program. Accordingly, the CAD program may run various simulations based on the intended design. The simulations may be employed to test performance, compatibility, and failure associated with different modifications.

As sheet metal is manipulated, various cracks may form. Thus, different tests may be performed to identify whether a specific variation or process leads to cracks. In performing these simulations, several issues may arise. In some cases, the simulations may not be accurate enough. Thus, the simulations may not adequately detect whether a crack or some other deleterious issue may arise.

In other cases, the simulations may over-predict an error. Accordingly, the simulation may indicate falsely that a certain manipulation, or combination of manipulations may lead to a crack. In these cases, manipulations that may be beneficial to the transformation of the part may not be pursued due to false information indicated via the simulation.

DESCRIPTION OF THE DRAWINGS

The detailed description refers to the following drawings, in which like numerals refer to like items, and in which.

SUMMARY

Figure 1:
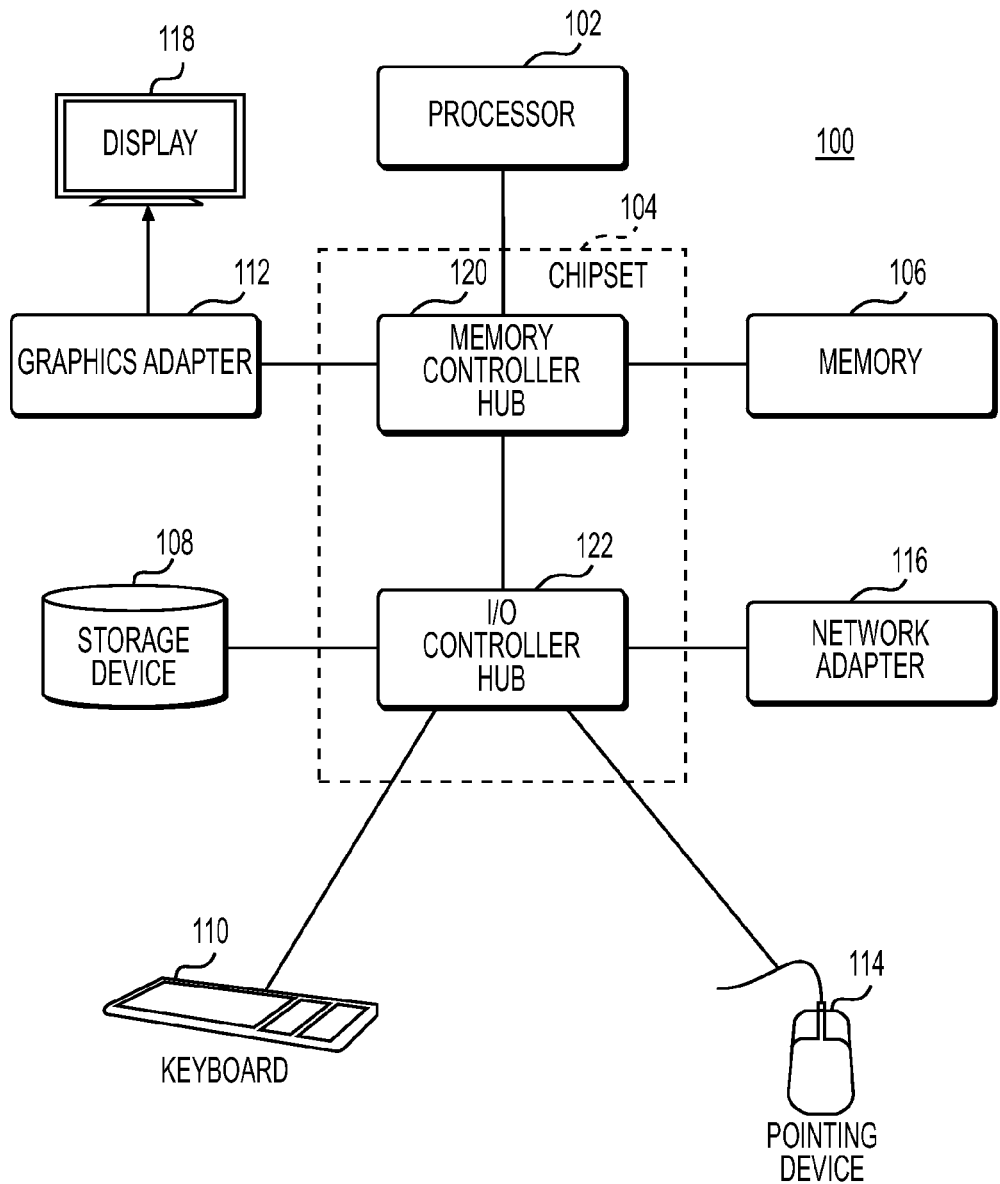
FIG. 1 is a block diagram illustrating an example computer.

The following description relates to system and methods for performing and communicating sheet metal simulations employing a combination of factors. Exemplary embodiments may also be directed to any of the system, the method, an application various computing devices described herein.

Additional features of the invention will be set forth in the description which follows, and in part will be apparent from the description, or may be learned by practice of the invention.

A system for simulating a sheet metal transformation is provided herein. The system includes a materials interface module to receive a plurality of data associated with materials employed with a sheet metal simulated via the sheet metal transformation to produce a transformed sheet metal; a formula interfacer to interface with an application associated with the sheet metal transformation to receive a plurality of formulas associated with the sheet metal transformation, the formula interfacer being configured to combine more than one sheet metal transformation test; and a formability interfacer to receive a parameter associated with a threshold of thinning and cracking associated with the transformed sheet metal. The system is configured to generate per predefined demarcated zones of the sheet metal data corresponding to transformed sheet metal response for each of the demarcated zones.

It is to be understood that both the foregoing general description and the following detailed description are exemplary and explanatory and are intended to provide further explanation of the invention as claimed. Other features and aspects will be apparent from the following detailed description, the drawings, and the claims.

DETAILED DESCRIPTION

CAD simulations associated with the manipulation of sheet metal may be performed via various CAD tools. Each simulation may indicate whether the manipulation of sheet metal may fail. By performing this analysis, a designer associated with the end product may be able to predictively forecast whether a certain manipulation associated with a specific sheet metal part may lead to cracks or other problems.

Currently, empirical guidelines exist as to whether certain manipulations cause problems. For example, empirical guidelines for thinning may be established. However, these empirical guidelines, when employed for practical applications in some cases over predict or under predict problems. In these cases, a manufacturer may have to redesign a part, thereby losing money and time associated with the delay.

Additionally, a finite element analysis (FEA) model exists and is currently employed in several simulation and CAD design tools. The FEA model is limited for the same reasons as mentioned above.

Disclosed herein are systems and methods for performing and communicating sheet metal simulations employing a combination of factors. The factors may be other tests and equations, such as FEA tests and other techniques for detecting cracks. By employing a simulation with additional factors and parameters, a greater accuracy of crack detection may occur and be achieved. Further, a thinner finished product may be realized.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer system 100. The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a video corpus, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

Figure 2:
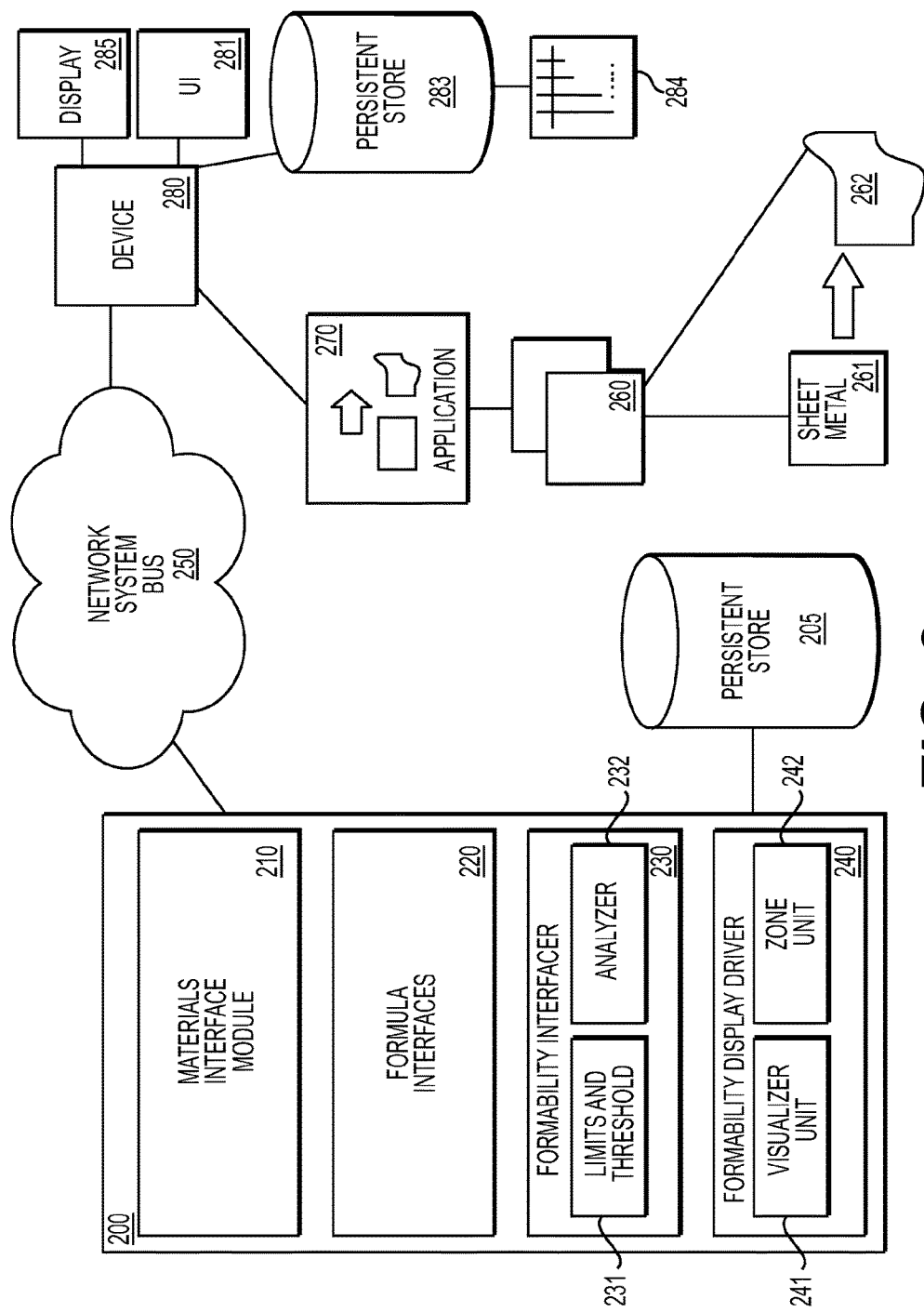
FIG. 2 illustrates an example of an implementation of a system for performing and communicating sheet metal simulations employing a combination of factors.

FIG. 2 illustrates a system 200 for performing and communicating sheet metal simulations employing a combination of factors. The system 200 includes an interface module 210, a formula interfacer 220, a formability interfacer 230, and a formability display driver 240. The system 200 may be performed via a device, such as computer 100. The system 200 may communicate via the other elements shown in FIG. 2 via a system bus 250. The system bus 250 may allow integration with the system 200 and the other elements, or may be a network that allows wired or wireless communication between the system 200 and the other elements.

As shown in FIG. 2, a data record 260 is provided to an application 270, via device 280. The application 270 may be any sort of computer application engineering program employed to allowed CAD design of sheet metal transformation. The application 270 may be executed and stored on any of the devices enumerated above with regards to computer 100, on device 280.

The data record 260 corresponds to data associated with a sheet metal transformation. The data record 260 may employ various numerical and symbolic representations associated with an intended transformation. For example, if a sheet metal 261 is intended to be transformed into transformed sheet metal 262.

Device 280 may include a user interface 281 and a display 282. In certain cases, the user interface 281 and the display 282 may be integrally provided, for example, if the device 280 is a touch screen. The device 280 may include, or communicate with a persistent store 283. The persistent store 283 may store information about various properties and parameters associated with sheet metal transformation. Accordingly, as the sheet metal is stretched, thinned, cut, stamped, bent, or undergoes any other manipulations—the persistent store 283 may incorporate a lookup table 284 with the various transformations cross-referenced with corresponding parameters and variables to execute a simulation. The parameters and variables may be incorporated into equations associated with the application 270. Some of the parameters and variables employed may be, for example, a beta ratio, a minor/major strain associated with the sheet metal 261 or the transformed sheet metal 262.

The materials interface module 210 interfaces with the sheet metal 261 to extract various properties associated with the sheet metal. For example, the materials interface module 210 may extract the Von Mises Stress, the Planar Effective Stress and Discrepancy Limits associated with sheet metal 261. Additionally, the materials interface module 210 may retrieve various other properties associated with the sheet metal 261, such as the Thinning Limit Curves, Bending Under Tension Limits, and Failure Stress Curve.

All, some, or at least one of the above-enumerated properties associated with sheet metal 261 may be retrieved by the materials interface module 210. In one example, the system 200 may retrieve the parameters based on information stored in a persistent store 205. In another example, the application 270 may transmit the information to system 200. In another example, system 200 may be provided as a module or build-on to the application 2700, and communicate integrally with procedures associated with application 270.

The formula interfacer 220 interfaces with the application 270 to ascertain which formulas are employed to perform a simulation. The formulas obtained by the application 270 may be contingent on the intended transformations and manipulations employed to modify sheet metal 261 to transformed sheet metal 262.

The formability interfacer 230 establishes limits and thresholds 231 associated with the transformed sheet metal 262. For example, various standards associated with a finished product may be established. In one example, the cracking threshold may be established (i.e. a parameter indicating how durable the part should be in order to withstand pressure before cracking). Another such parameter may be the thinness of the part at a given region of the transformed sheet metal 262. The limits 231 may be predetermined via an operator of application 270 and system 200, or retrieved from a database or standards source.

The formability interfacer 230 may also include an analyzer 232. The analyzer 232 receives as input the information ascertained by both elements 210 and 220, and performs various analysis associated with detecting cracking via transformed sheet metal 262. Thus, based on known parameters of the sheet metal 261, the processes employed to create transformed sheet metal 262—the analyzer 232 may determine per region how stable each region is (i.e. whether a crack is liable to be formed, how thin the region, how susceptible to failure the region is). A region may be a demarcated section of the transformed sheet metal 262.

The formability display driver 240 includes a visualizer unit 241 and a zone unit 242. The various aspects of the visualizer unit 241 and the zone unit 242 described below may be selectively provided.

The visualizer unit 241 retrieves the information ascertained by the formula interfacer 220, and provides information that may be graphical rendered on a display 285. The information that is graphically rendered may indicate whether the user provided limits and thinning ranges indicate that a crack is generated.

Figure 4:
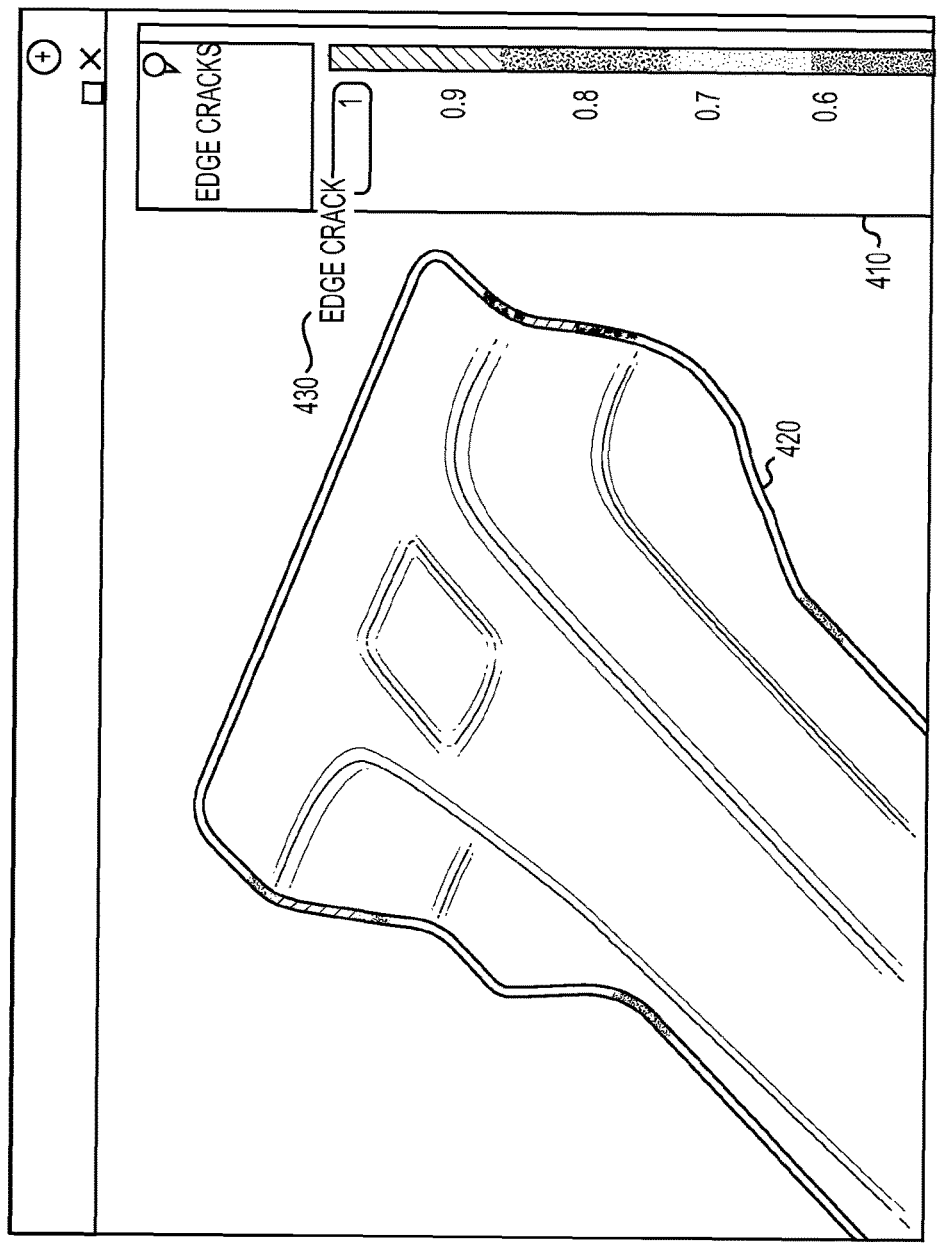
FIG. 4 illustrates an example of a display employing the system described in FIG. 2.

FIG. 4 illustrates an example of the display 285 showing the visualizer unit 241. As shown in FIG. 4, a simulated display of a transformed sheet metal 262 is provided. The various edges of the transformed sheet metal 262 indicate different colors and patterns, with each color or patter indicating whether a crack is formed.

In FIG. 4, the display includes various graphical user interface (GUI) elements. A legend 410 is shown that shows a correspondence to a pattern with a specific amount of edge crack 430. Thus, as shown in the display, a digital representation of the sheet metal 420 indicates at least one of the patterns 410 in various portions. The pattern on 420 indicates whether an edge crack 430 is likely to occur.

The zone unit 242 displays the failure locations of the transformed sheet metal 262. The various failure modes may be any of those enumerated in FIGS. 5(a) and (b). Additionally, the areas of the transformed sheet metal 262 that are deemed as passing (i.e., passing the thinning requirements established by the application 270 or predetermined by an implementer of system 200) may be indicated by a color as well.

Figure 5A:
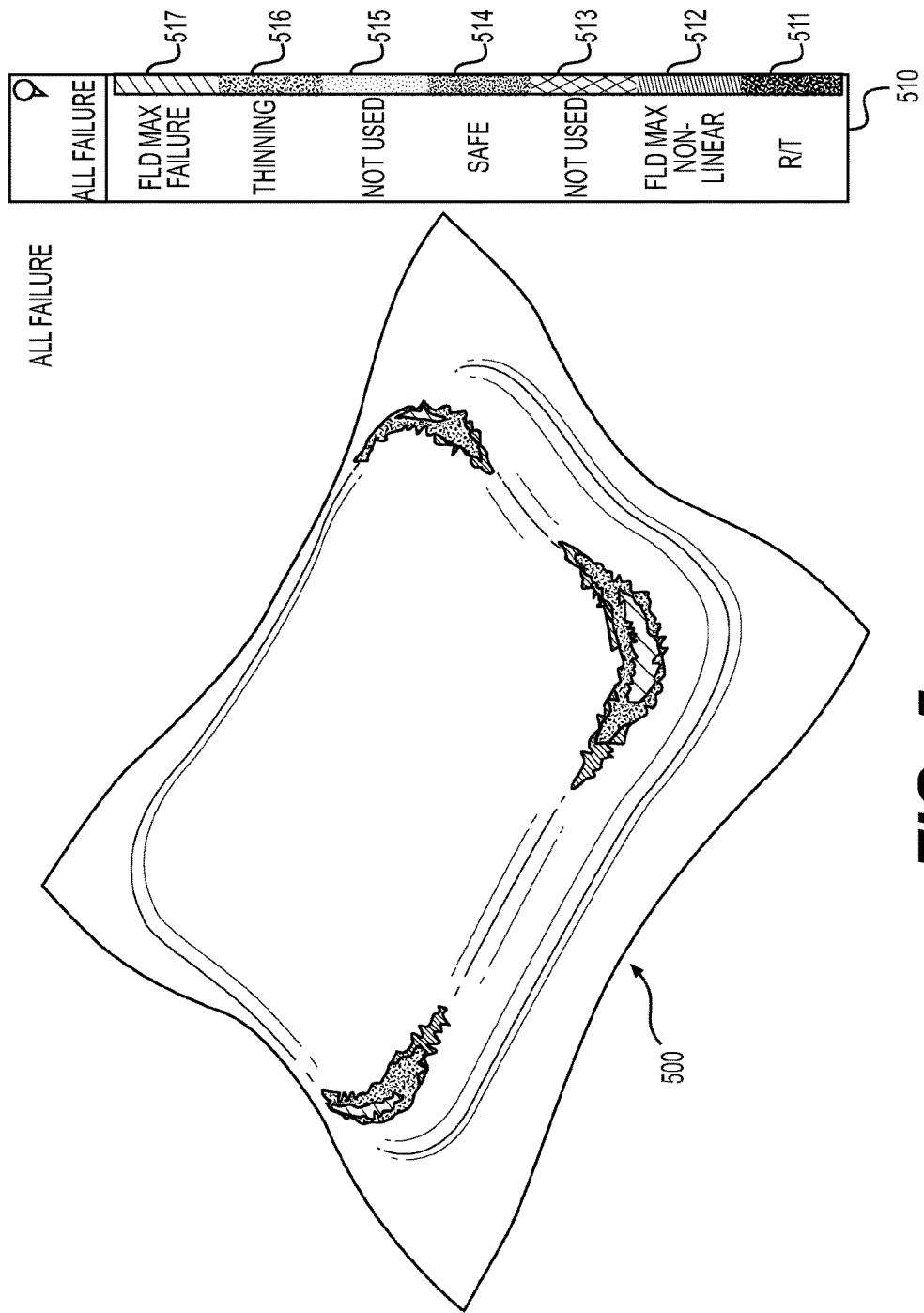
FIGS. 5(*a*) and 5(*b*) illustrate an example of a display employing the system described in FIG. 2.

FIGS. 5(a) and (b) illustrate an example the display 285 showing a sample output of the zone unit 242. As shown in FIGS. 5(a) and (b), various regions are filled with various patterns. The patterns indicate whether the region is liable to be too thin to be stable or within a predetermined threshold, or is passable (i.e., thin enough).

Referring to FIG. 5(a), the legend 510 corresponds to a specific error (511-517) with a specific pattern. As shown in the display in FIG. 5(a), the various patterns are shown on the digital rendition of the transformed sheet metal at a portion on the sheet metal where the simulation predicts an error is to occur.

Figure 5B:
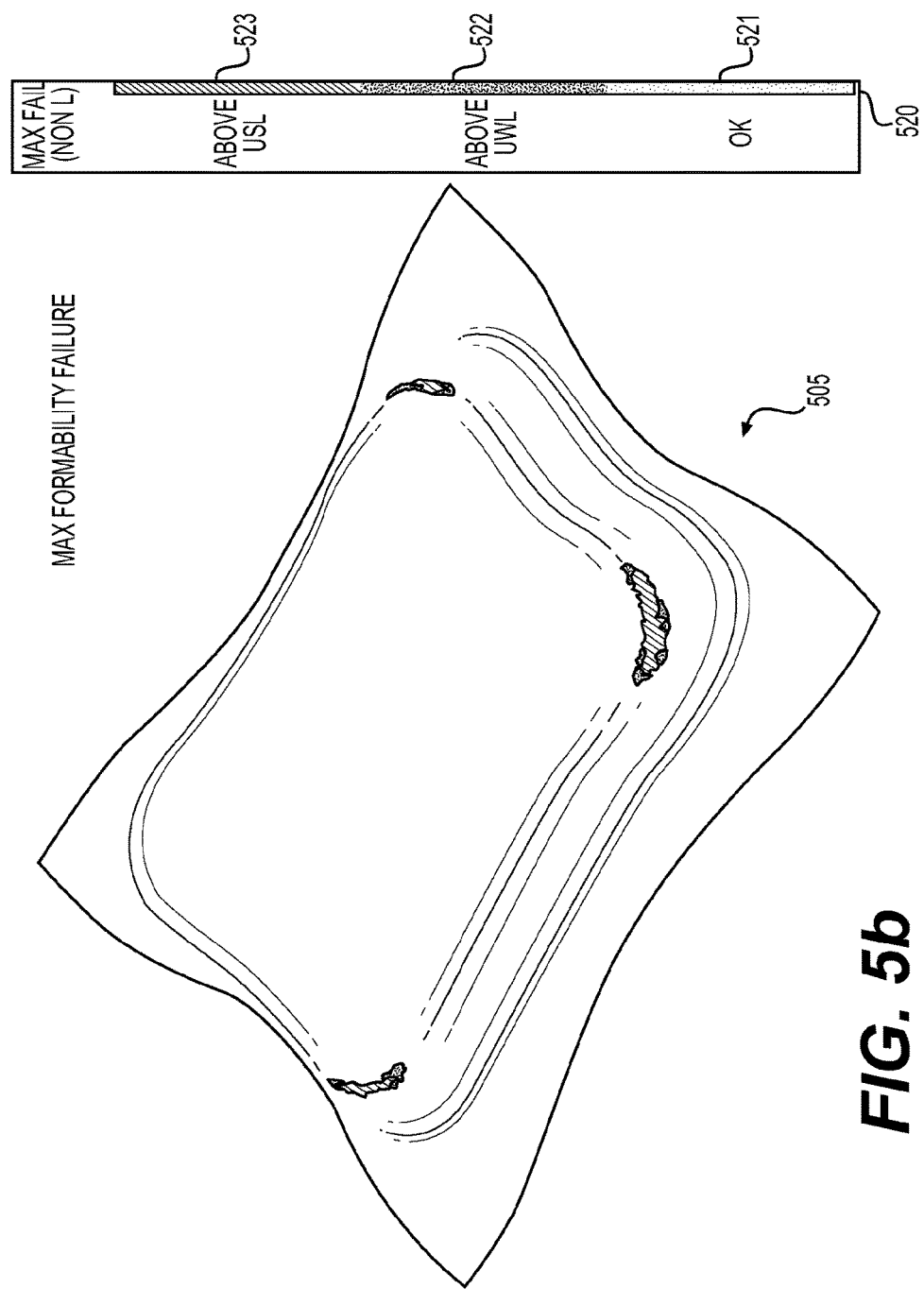

In FIG. 5(b), a legend 520 is shown that corresponds the likelihood of failure associated with a max formability failure test. The max formability failure test is known, and thus, a detailed description will be omitted. Similar to the displays shown in FIG. 4 and FIG. 5(a), the patterns 521-523 correspond to a likelihood of formability failure, and are shown on the digitally rendered transformed sheet metal 505.

Figure 3:
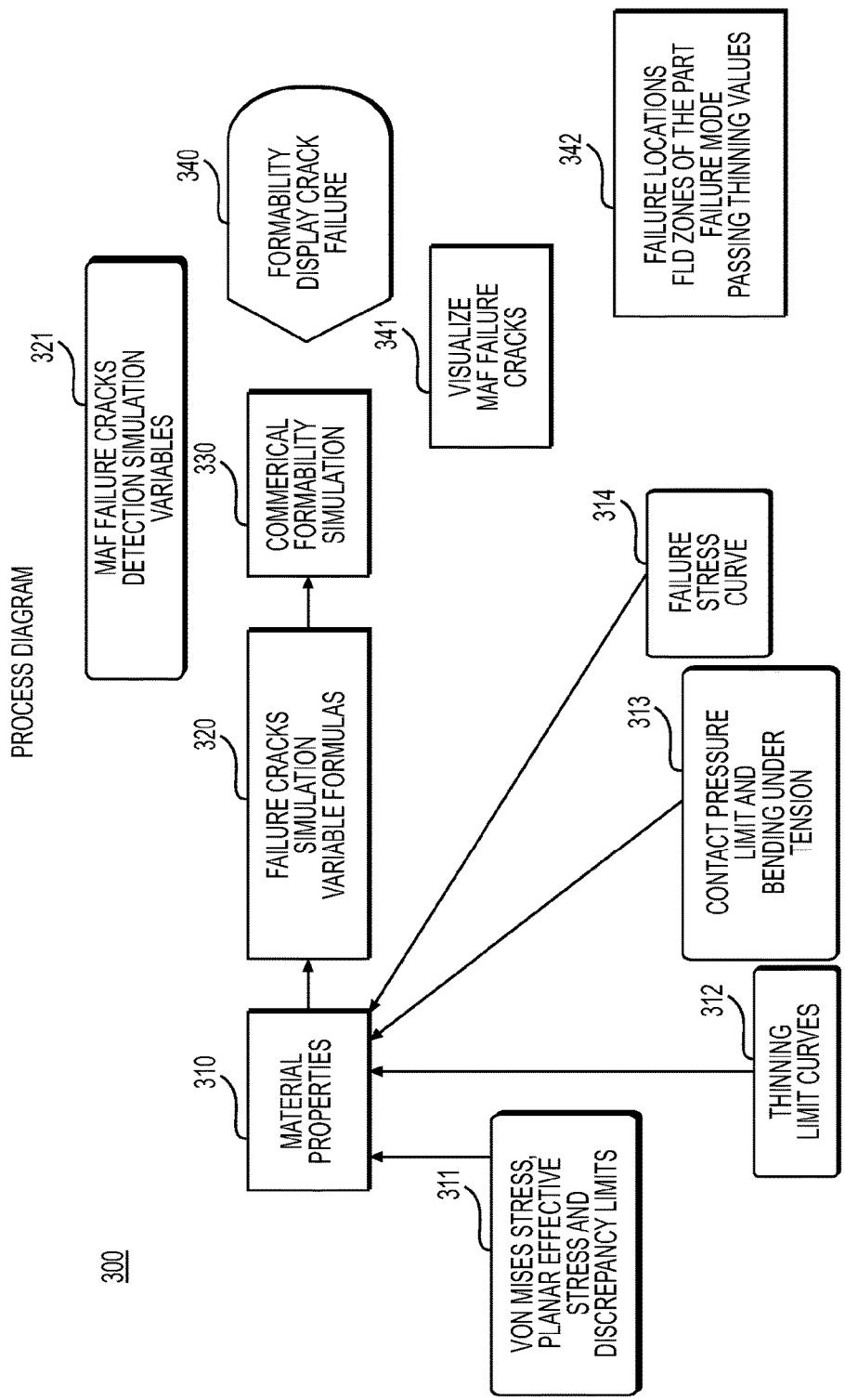
FIG. 3 illustrates an example of an implementation of a method for performing and communicating sheet metal simulations employing a combination of factors.

FIG. 3 illustrates an example of a method 300 for performing and communicating sheet metal simulations employing a combination of factors. The method 300 may be implemented on a system or a device, such as computer 100 described above.

In operation 310, a property associated with sheet metal is retrieved and stored. Various properties may be obtained about the sheet metal, for example, stresses 311, thinning limit curves 312, pressure and tension 313, and a failure stress curve 314.

In operation 320, a formula is retrieved based on a transformation of the sheet metal. For example, an example formula retrieved may be the following:

IF (AND (MINOR_STRESS/MAJOR_STRESS>0.8; MINOR_STRESS<0.9); $sqrt((sqr(MAJOR\_STRESS-MINOR\_STRESS)+sqr(MINOR\_STRESS+CONTACT\_PRESSURE)+sqr(=CONTACT\_PRESSURE-MAJOR\_STRESS))/2)$; 0)

Thus, based on the above example of a formula employed by operation 320, the method 300 may proceed to operation 330.

In operation 330, the commercial formability simulation is performed. Essentially, the analysis performed by operation 320 is cross-referenced with predetermined limits entered by an implementer of method 300.

In operation 340, the errors or passed regions of the transformed sheet metal are shown. For example, the visualized failure cracks may be shown (341), or the failure locations 342 may be shown.

Thus, employing system 200 and method 300, the ability to ascertain and visualize cracks and locations may be performed in an integrated process. Accordingly, a process of simulating transformed sheet metal may be speeded up, as the two goals enumerated above (e.g., ascertain cracks and failure locations) may be performed in an integrated test.

Certain of the devices shown in FIG. 1 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIG. 3. The disclosed devices, components, and systems contemplate using or implementing any suitable technique for performing the steps illustrated in these figures. Thus, FIG. 3 is for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., a FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

The invention claimed is:

1. A system for simulating a sheet metal transformation, comprising:
    a data store comprising a computer readable medium storing a program of instructions for the simulation;
    a processor that executes the program of instructions;
    a materials interface module to retrieve, from a persistent store associated with the processor, a plurality of sheet metal properties data associated with materials employed with a sheet metal simulated via the sheet metal transformation to produce a transformed sheet metal;
    a formula interfacer to interface with an application associated with the sheet metal transformation to retrieve, from the persistent store, a plurality of formulas associated with, at least, an intended transformation corresponding to the sheet metal transformation, the formula interfacer being configured to combine more than one sheet metal transformation test;
    a formability interfacer to retrieve, from the persistent store, a parameter associated with a threshold of thinning and cracking associated with the transformed sheet metal; and
    an analyzer associated with the formability interface, the analyzer being configured to generate, per predefined demarcated zones of the sheet metal, data corresponding to transformed sheet metal response for each of the demarcated zones, wherein the analyzer generates the data using the plurality of sheet metal properties data, the plurality of formulas, and the parameter.

2. The system according to claim 1, further comprising a formability display driver to communicate to a digital display the data, the data being defined as a type of failure associated with each of the demarcated zones.

3. The system according to claim 2, wherein the plurality of formulas employs data generated from a combination of stress tests, thinning limit curve tests, pressure and tension tests, and a failure stress curve tests.

4. The system according to claim 3, wherein each of the tests is represented by a unique color or pattern and rendered onto a digitally rendered version of the transformed sheet metal.

5. The system according to claim 1, further comprising a formability display driver to communicate to a digital display the data, the data being defined as an indication of whether each of the demarcated zones undergoes a formability failure.

6. The system according to claim 5, wherein the parameter is defined as a predefined limit associated with each of the demarcated zones.

7. The system according to claim 6, wherein the predefined limit is defined as a cracking threshold for the sheet metal based on the data of the associated materials.

8. The system according to claim 6, wherein the predefined limit is defined as an allowable thinness for each of the demarcated zones based on the data of the associated materials.

9. The system according to claim 5, wherein a likelihood of cracking is represented by a unique color or pattern and rendered onto a digitally rendered version of the transformed sheet metal.

10. The system according to claim 1, wherein the formability interfacer identifies a plurality of the demarcated zones as edge pieces, and analyzes whether an edge crack is to occur for each of the identified edge pieces of the demarcated zones.

11. A method for simulating a sheet metal transformation, comprising:
    retrieving, from a persistent store, an electronic representation of materials associated with a sheet metal to undergo the sheet metal transformation;
    employing a plurality of variables with a plurality of sheet metal transformations tests to provide a single set of output data for the transformed sheet metal;
    retrieving, from the persistent store, a parameter associated with a threshold of thinning and cracking associated with the transformed sheet metal; and
    performing a commercial formability simulation based on the electronic representation of the materials, the parameter, and the plurality of received variables,
    wherein the retrieving, the employing, and the performing is performed on a processor.

12. The method according to claim 11, wherein the plurality of tests comprises a stress test, a thinning limit curve test, a contact pressure limit and bending under tension test, and a failure stress curve test.

13. The method according to claim 12, wherein the plurality of tests each have an individual formula, and a single formula is derived by combining each of the plurality of test's individual formula.

14. The method according to claim 13, further comprising deciding to display at least one of the failure zones based on the plurality of tests or a thinning value associated with the transformed sheet metal.

\* \* \* \* \*